US007360406B2

(12) United States Patent
McDaniel et al.

(10) Patent No.: US 7,360,406 B2
(45) Date of Patent: Apr. 22, 2008

(54) METHOD OF DETERMINING THE REST POSITION OF AN INTERNAL COMBUSTION ENGINE

(75) Inventors: Christopher I. McDaniel, Kokomo, IN (US); Michael J. Frey, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 70 days.

(21) Appl. No.: 11/493,262

(22) Filed: Jul. 26, 2006

(65) Prior Publication Data

US 2008/0022760 A1 Jan. 31, 2008

(51) Int. Cl.
*G01M 15/00* (2006.01)

(52) U.S. Cl. .................................................... 73/117.2

(58) Field of Classification Search .................. 73/116, 73/117.2, 117.3, 118.1
See application file for complete search history.

(56) References Cited

U.S. PATENT DOCUMENTS 5,079,945 A * 1/1992 Hansen et al. ................ 73/116
5,604,304 A * 2/1997 Kokubo et al. ............ 73/117.3
6,324,488 B1 * 11/2001 Siegl .......................... 702/151
6,499,342 B1 * 12/2002 Gonzales, Jr. ............. 73/117.3
6,684,687 B1 * 2/2004 Frojdh ........................ 73/117.3
7,032,440 B2 * 4/2006 Kishibata et al. .......... 73/117.3
2004/0211248 A1 * 10/2004 Kassner ...................... 73/117.3
2006/0162701 A1 * 7/2006 Kassner ...................... 123/479
2007/0245817 A1 * 10/2007 Matsushima et al. ...... 73/118.1

* cited by examiner

*Primary Examiner*—Eric S. McCall
(74) *Attorney, Agent, or Firm*—Jimmy L. Funke

(57) ABSTRACT

The final rest position of an internal combustion engine crankshaft is determined by counting pulses of a CRANK signal responsive to crankshaft rotation after engine turn-off and evaluating the timing of the pulse edges to detect reversals in the direction of crankshaft rotation. Times are assigned to a given edge of each CRANK signal pulse, and a ratio of specified time intervals is compared to a threshold to detect crankshaft rock-back for controlling the pulse count direction.

6 Claims, 3 Drawing Sheets

| CRANK PULSE COUNT | PULSE EDGE TIME (SECONDS) | ROCK BACK RATIO R | ENGINE DIRECTION | CRANK TOOTH NUMBER |
|---|---|---|---|---|
| 0 | -8.95500 | | FORWARD | 25 |
| 1 | -8.94928 | 0.330 | FORWARD | 26 |
| 2 | -8.94302 | 0.329 | FORWARD | 27 |
| 3 | -8.93597 | 0.325 | FORWARD | 28 |
| 4 | -8.92755 | 0.313 | FORWARD | 29 |
| 5 | -8.91612 | 0.190 | FORWARD | 30 |
| 6 | -8.87569 | 0.569 | REVERSE | 30 |
| 7 | -8.85646 | 0.266 | REVERSE | 29 |
| 8 | -8.84392 | 0.298 | REVERSE | 28 |
| 9 | -8.83363 | 0.322 | REVERSE | 27 |
| 10 | -8.82449 | 0.328 | REVERSE | 26 |
| 11 | -8.81603 | 0.329 | REVERSE | 25 |
| 12 | -8.80788 | 0.331 | REVERSE | 24 |
| 13 | -8.79986 | 0.331 | REVERSE | 23 |
| 14 | -8.79182 | 0.329 | REVERSE | 22 |
| 15 | -8.78347 | 0.330 | REVERSE | 21 |
| 16 | -8.77457 | 0.328 | REVERSE | 20 |
| 17 | -8.76471 | 0.323 | REVERSE | 19 |
| 18 | -8.75296 | 0.307 | REVERSE | 18 |
| 19 | -8.73630 | 0.276 | REVERSE | 17 |
| 20 | -8.70428 | 0.342 | REVERSE | 16 |
| 21 | -8.65936 | 0.431 | FORWARD | 16 |
| 22 | -8.63219 | 0.276 | FORWARD | 17 |
| 23 | -8.60594 | 0.291 | FORWARD | 18 |
| 24 | -8.56917 | | FORWARD | 19 |

METHOD OF DETERMINING THE REST POSITION OF AN INTERNAL COMBUSTION ENGINE

TECHNICAL FIELD

The present invention relates to a method of determining the final rest position of an internal combustion engine following a period of operation.

BACKGROUND OF THE INVENTION

When starting an internal combustion engine, it is useful to know the rest position of the engine crankshaft prior to cranking so that fuel and spark settings can be targeted accordingly. In this way, the engine starts in less time and consumes the delivered fuel more efficiently. However, it is difficult to determine the position at which the engine crankshaft stops rotating. This is because crankshaft position sensors are not designed to indicate the direction of rotation, and the crankshaft may reverse directions one or more times due to cylinder air compression before the rest position is finally achieved. If the engine speed at turn-off is too slow for the crankshaft to continue rotating through the next compression cycle, the crankshaft will reverse directions, or "rock-back". If the engine speed is rotating faster at turn-off, the crankshaft will rotate through the next compression cycle, or "rock-forward".

Although it is possible to predict or estimate the final position of the crankshaft based on engine speed and crankshaft position measurements, the estimate is only accurate to within 90 crank degrees of the actual crankshaft position. This inaccuracy can cause the engine to begin fueling on the wrong cylinder when the engine is re-started. As a result, the engine must be cranked longer before starting, and the initial exhaust emissions can exceed the regulated limits. Accordingly, what is needed is a method of more accurately determining the final rest position of an internal combustion engine.

SUMMARY OF THE INVENTION

The present invention provides an improved method of determining the final rest position of an internal combustion engine crankshaft by counting pulses of a CRANK signal responsive to crankshaft rotation after engine turn-off and evaluating the timing of the pulse edges to detect reversals in the direction of crankshaft rotation. Times are assigned to a given edge of each CRANK signal pulse, and a ratio of specified time intervals is compared to a threshold to detect crankshaft rock-back for controlling the pulse count direction.

DESCRIPTION OF THE PREFERRED EMBODIMENT

Figure 1:
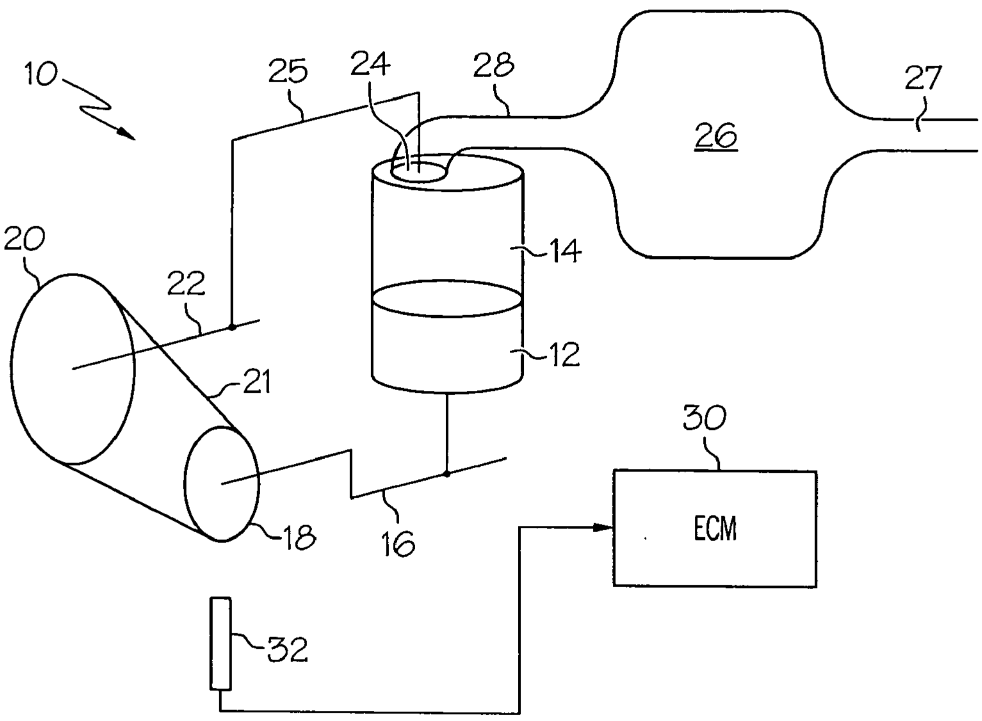
FIG. 1 is a diagram of a four-stroke internal combustion engine and an engine control module (ECM) for carrying out the method of the present invention.

Referring to FIG. 1, the present invention is disclosed in the context of a six-cylinder four-stroke internal combustion engine, generally designated by the reference numeral 10. The engine 10 includes a set of six pistons 12 (only one of which is shown) which reciprocate in respective cylinders 14 and are connected to crankshaft 16. The crankshaft 16 is connected to the crank-wheel 18, which is mechanically coupled to a cam-wheel 20 by a belt or chain 21 so that the crank-wheel 18 and the cam-wheel 20 rotate synchronously. The cam-wheel 20 is connected to a camshaft 22, which opens and closes a cylinder intake valve 24 through a mechanical linkage 25 in coordination with the movement of piston 12. Intake air enters an intake manifold 26 through a throttle passage 27, and is delivered to each of the cylinders 14 via a respective intake runner 28 and intake valve 24. Obviously, engine 10 includes many other component parts such as exhaust valves that are also conventional and known in the state of the art to be part of an operational engine.

A microprocessor-based engine control module (ECM) 30 controls the timing of various engine cycle-related events (including fuel injection and spark timing, for example) based in part on a CRANK signal produced by a sensor 32 responsive to the rotation of crank-wheel 18. Typically, the outer periphery of crank-wheel 18 is toothed, and the sensor 32 is a variable reluctance or similar sensor that produces electrical pulses corresponding to movement of the crank-wheel teeth. In the illustrated embodiment, crank-wheel 18 is provided with a set of fifty-eight teeth and an 18° notch or gap for synchronization, but different tooth encoding configurations can be used. In any event, the CRANK signal is a pulsetrain comprising a series of pulses that continue to be produced as long as the crankshaft is rotating, with no explicit indication of the direction of crankshaft rotation. Thus, simply counting the CRANK signal pulses after engine turn-off will not provide an accurate indication of the crankshaft rest position because the crankshaft 16 may experience one or more reversals or rock-backs prior to stopping.

Figure 2:
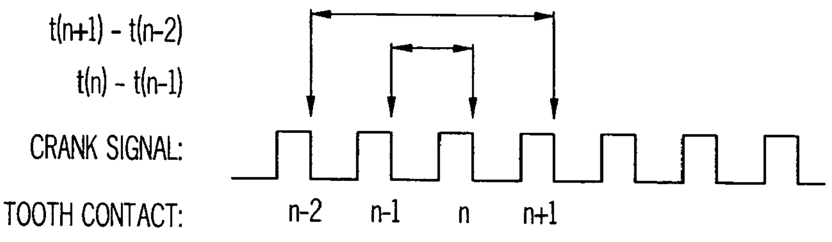
FIG. 2 depicts a portion of a CRANK signal developed for the engine of FIG. 1, along with a set of timing intervals used to detect engine rock-back according to the present invention.

The present invention provides a method of accurately determining the final rest position of the crankshaft 16 by counting pulses of the CRANK signal after engine turn-off and evaluating the timing of the CRANK signal pulse edges to detect crankshaft reversals or rock-backs that occur prior to stopping. FIG. 2 depicts a series of four CRANK signal pulses numbered as n−2, n−1, n, and n+1. The ECM 30 includes a free-running clock and assigns each of the four pulses a time based on when its falling edge is detected. For purposes of discussion, the variables t(n−2), t(n−1), t(n), and t(n+1) designate the times that are respectively assigned to the pulse numbers n−2, n−1, n, and n+1. Once the times have been assigned, ECM 30 computes a rock-back ratio R according to the equation:

$$R=[t(n)-t(n-1)]/[t(n+1)-t(n-2)]$$

and compares the ratio R to a calibration constant. If the direction of crankshaft rotation over the computation interval is unchanged, the rock-back ratio R will have a value of approximately 0.333 or less. However, if the direction of rotation reverses between pulse numbers n and n+1, the pulse numbers n and n+1 are generated by just one crank-wheel tooth, and the rock-back ratio R will have a higher value, in excess of 0.400. Assuming the calibration constant C is set equal to 0.400, a crankshaft reversal or rock-back is detected when R>C. At such point, further CRANK pulses reduce the accumulated pulse count to reflect the fact that the crankshaft 16 is rotating backwards. The ECM continues to monitor the rock-back ratio R (and reverse the pulse count direction if another rock-back is detected) until the crankshaft is rotating too slowly to generate CRANK signal pulses. The final pulse count at such point designates the rest position of the crankshaft 16 to within one or two CRANK pulses, approximately 12° of crankshaft rotation with the crank-wheel tooth configuration of the illustrated embodiment.

Figures 3, 4:
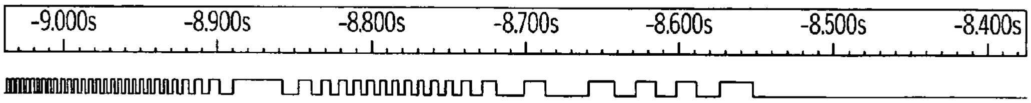
FIG. 3 is an example of a CRANK signal developed following engine turn-off.
FIG. 4 is a table depicting data collected and computed by the ECM of FIG. 1 for the CRANK signal of FIG. 3.

FIGS. 3-4 depict an example of the operation of this invention for the engine 10 of FIG. 1. FIG. 3 shows the CRANK signal pulses, beginning at engine turn-off, and FIG. 4 shows data collected by ECM 30 for carrying out the method of the invention. The data includes a pulse transition (falling edge) count, the time assigned to each pulse transition, the rock-back ratio R, the direction of engine rotation, and the current engine position in terms of crank-wheel tooth number. The times assigned to the pulse transitions are also shown in FIG. 3 above the CRANK signal.

Referring to FIG. 4, engine turn-off occurs at time=8.955 seconds, and the computed rock-back ratio R decreases for the first five CRANK pulses as the engine is decelerated by cylinder compression. On the sixth CRANK pulse, a rock-back occurs, and the engine begins to rotate in reverse. The rock-back is detected by the magnitude of the rock-back ratio, which suddenly exceeds the calibration constant C, which may have a value of 0.400, for example. The computation of the rock-back ratio R at such point is given by:

$$R=[t(6)-t(5)]/[t(7)-t(4)]=0.569$$

While the engine is rotating in the reverse direction, the engine position pulse count is reversed, as seen in the right-most column of FIG. 4; as shown, the fifth and sixth CRANK signal pulse transitions correspond to the same crank-wheel tooth number (30) due to the reversal of engine rotation. On the twenty-first CRANK pulse, a second rock-back occurs, and the engine begins to rotate forward again. The computation of the rock-back ratio R in this case is given by:

$$R=[t(21)-t(20)]/[t(22)-t(18)]=0.431$$

During the ensuing forward rotation of the engine, the engine position pulse count begins accumulating in the positive direction again, as seen in the right-most column of FIG. 4; as shown, the twentieth and twenty-first CRANK signal pulse transitions correspond to the same crank-wheel tooth number (16) due to the reversal of engine rotation. After the twenty-fourth CRANK signal pulse transition, the engine is rotating too slowly to produce CRANK signal pulses, and the final engine rest position in term of crank-wheel tooth number is given as 19. If desired, the pulse incrementing and decrementing may be expressed mathematically in terms of the initial crank tooth number CTN (0), the number r1 of CRANK signal pulses between engine turn-off and the first rock-back event, the number r2 of CRANK signal pulses between engine turn-off and the second rock-back event, and the total number CP of CRANK signal pulses since engine turn-off, as follows:

$$CTN(0)+(r1-1)-[(r2-1)-r1]+(CP-r2)$$

Using the example of FIGS. 3-4, the final rest position of engine 10 may be calculated as follows:

$$25+(6-1)-[(21-1)-6]+(24-21)=19$$

This means that the when engine 10 came to a stop, the sensor 32 was aligned with the nineteenth crank-wheel tooth following the crank-wheel synchronization feature (i.e., the 18° notch or gap). As indicated above, this number is accurate to within one or two CRANK signal pulses, or approximately 12° of crankshaft rotation with a 58-tooth crank-wheel. This guarantees that the engine will always begin fueling on the correct cylinder, which allows the engine to start promptly with low emissions.

Figure 5:
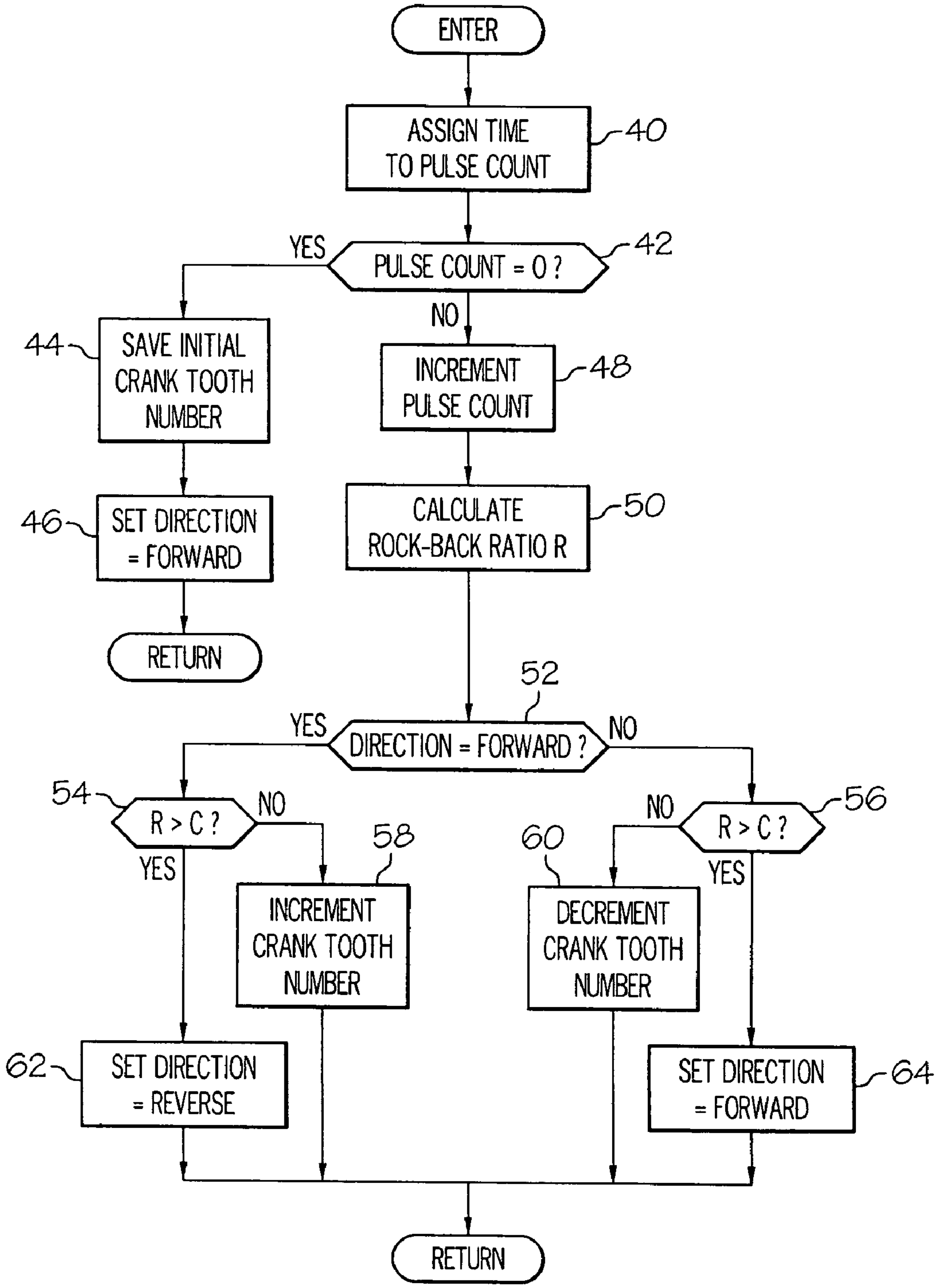
FIG. 5 is a flow diagram representative of a software routine executed by the ECM of FIG. 1 for carrying out the method of this invention.

The flow diagram of FIG. 5 represents an interrupt service routine executed by ECM 30 at each falling edge of the CRANK signal pulsetrain, beginning at engine turn-off. The number of pulse transitions following engine turn-off is maintained by the variable Pulse Count, and the block 40 is first executed to assign a time to current pulse count. At engine turn-off, Pulse Count is reset to zero, and block 42 checks for this condition. If the pulse count is zero, blocks 44 and 46 are executed to save the initial crank tooth number (i.e., the initial engine position) and to set a Direction flag to Forward (indicating that crankshaft 16 is rotating in the forward direction). In subsequent executions of the routine, block 42 is answered in the negative, and blocks 48 and 50 are executed to increment Pulse Count and to calculate the rock-back ratio R. The block 52 determines the state of the Direction flag, and blocks 54 or 56 then compare the calculated rock-back ratio R to the calibration constant C. Initially, the Direction flag is Forward, and the block 54 compares the ratio R to the constant C. If R<=C, the engine is still rotating forward, and the block 58 is executed to increment the saved crank tooth number. If block 54 determines that R>C, the direction of engine rotation has changed; the crank tooth number is not changed, and block 62 is executed to set the Direction flag to Reverse. In the next execution of the routine, the state of the Direction flag is Reverse, and the block 56 compares the ratio R to the constant C. If R<=C, the engine is still rotating in the reverse direction, and block 60 is executed to decrement the saved crank tooth number. If R>C, the direction of engine rotation has changed; the crank tooth number is not changed, and block 64 is executed to set the Direction flag to Forward.

In summary, the method of the present invention provides a way of accurately tracking the crankshaft position after engine turn-off, enabling prompt re-starting of an engine with low emissions. While the present invention has been described with respect to the illustrated embodiment, it is recognized that numerous modifications and variations in addition to those mentioned herein will occur to those skilled in the art. For example, the method may be applied to engines having different crank-wheel configurations, a different number of cylinders, and so on. Accordingly, it is intended that the invention not be limited to the disclosed embodiment, but that it have the full scope permitted by the language of the following claims.

The invention claimed is:

1. A method of determining a rest position of an engine following an engine turn-off event, comprising the steps of:

producing a pulsetrain including a series of pulses based on rotation of a shaft of said engine;

identifying an initial pulse number corresponding to a position of said engine at said turn-off event;

detecting edges of said pulses during an interval following said turn-off event;

evaluating a timing relationship among successively produced pulses of said pulsetrain to determine whether a direction of rotation of said shaft is forward or reverse; and determining said rest position by incrementing said initial pulse number according to the pulses produced while the direction of rotation is determined to be forward and decrementing said initial pulse number according to the pulses produced while the direction of rotation is determined to be reverse.

2. The method of claim 1, including the steps of:

evaluating a timing relationship among successive pulses of said pulsetrain to detect a reversal in direction of rotation of said shaft;

setting the direction of rotation to forward at said turn-off event; and changing the direction of rotation from forward to reverse when a first reversal in the direction of rotation of said shaft is detected.

3. The method of claim 2, including the step of:

changing the direction of rotation from reverse to forward when a second reversal in the direction of rotation of said shaft is detected.

4. The method of claim 3, including the steps of:

counting the pulses of said pulsetrain produced after said turn-off event; and calculating said rest position according to the expression:

$$CTN(0)+(r1-1)-[(r2-1)-r1]+(CP-r2)$$

where CTN(0) is said initial pulse number, r1 is a pulse count when said first reversal is detected, r2 is a pulse count when said second reversal is detected, and CP is a final pulse count of said pulsetrain.

5. The method of claim 1, including the steps of:

assigning times to said successively produced pulses as their edges are detected;

defining a first time interval based on the times assigned a first pair of successive pulses, and a second time interval based on the times assigned to a second pair of pulses oppositely disposed about said first pair of pulses;

computing a ratio of said first and second time intervals; and comparing said ratio to a threshold value to detect a reversal in direction of rotation of said shaft.

6. The method of claim 5, where the computed ratio is a ratio of said first time interval to said second time interval, and said reversal in direction of rotation of said shaft is detected when said ratio exceeds said threshold.

* * * * *